United States Patent
Bouazizi et al.

(10) Patent No.: US 11,444,988 B2
(45) Date of Patent: Sep. 13, 2022

(54) SIGNALING OF SCENE DESCRIPTION FOR MULTIMEDIA CONFERENCING

(71) Applicant: QUALCOMM Incorporated, San Diego, CA (US)

(72) Inventors: Imed Bouazizi, Frisco, TX (US); Nikolai Konrad Leung, San Francisco, CA (US); Thomas Stockhammer, Bergen (DE)

(73) Assignee: Qualcomm Incorporated, San Diego, CA (US)

( * ) Notice: Subject to any disclaimer, the term of this patent is extended or adjusted under 35 U.S.C. 154(b) by 49 days.

(21) Appl. No.: 17/069,423

(22) Filed: Oct. 13, 2020

(65) Prior Publication Data

US 2021/0297460 A1 Sep. 23, 2021

Related U.S. Application Data

(60) Provisional application No. 62/990,895, filed on Mar. 17, 2020.

(51) Int. Cl.
*H04L 12/66* (2006.01)
*H04M 3/00* (2006.01)
(Continued)

(52) U.S. Cl.
CPC ...... *H04L 65/1104* (2022.05); *G06F 16/9024* (2019.01); *H04L 65/1069* (2013.01); *H04L 65/1101* (2022.05)

(58) Field of Classification Search
CPC ............... G06T 19/006; G06T 2200/04; G06T 2219/024; G06T 7/60; G06T 2215/16;
(Continued)

(56) References Cited

U.S. PATENT DOCUMENTS 8,316,089 B2  11/2012  Thakkar et al.
9,143,722 B2   9/2015  Oran
(Continued)

FOREIGN PATENT DOCUMENTS

JP   2011065263 A   3/2011

OTHER PUBLICATIONS

ETSI GR ARF 001, "Augmented Reality Framework (ARF) AR Standards Landscape", ETSI Draft Specification, ARF 001, European Telecommunications Standards Institute (ETSI), Sophia-Antipolis, France, vol. ISG ARF Augmented Reality Framework, No. V0.0.10, Mar. 18, 2019, pp. 1-39, XP014340571, Retrieved from the Internet: URL:docbox.etsi.org/ISG/ARF/70-Draft/001/ARF-001V0010.docx [retrieved on Mar. 18, 2019] Sections 6.1, 6.4.

(Continued)

*Primary Examiner* — Kharye Pope
(74) *Attorney, Agent, or Firm* — The Marbury Law Group

(57) ABSTRACT

Various embodiments include systems and methods for providing an immersive three-dimensional group session. Various embodiments include methods and devices for signaling a description of a scene with media components potentially coming from different parties. In various aspects, a scene graph may be signaled through a session description protocol (SDP) during a session initiation protocol (SIP) session setup. In various embodiments, the scene graph may include respective graphical output nodes assigned to be controlled by each of the plurality of participant computing devices in an immersive three-dimensional group session.

30 Claims, 13 Drawing Sheets

(51) Int. Cl.
*H04M 5/00* (2006.01)
*H04L 65/1104* (2022.01)
*G06F 16/901* (2019.01)
*H04L 65/1069* (2022.01)
*H04L 65/1101* (2022.01)

(58) Field of Classification Search
CPC ..... G06T 2200/24; G06T 19/20; G06T 17/00; G06T 19/00; G06T 15/00; G06T 13/20; G06V 20/20; G06V 20/653; G06V 20/00; H04L 67/10; H04L 65/1069; H04L 69/329; H04L 67/12; H04L 29/06027; H04L 45/72; H04L 65/1006; H04L 65/403; H04L 65/4076; H04N 21/8586; H04N 21/4126; H04N 21/41407; H04N 21/4316; H04N 21/4532; H04N 21/8543; H04N 21/4312; H04N 21/6175; H04N 21/643; H04N 13/275
USPC ........ 345/633, 419, 156; 709/204, 219, 228, 709/229, 227
See application file for complete search history.

(56) References Cited

U.S. PATENT DOCUMENTS

| | | |
|---|---|---|
| 9,692,911 B1 | 6/2017 | Chowdhury et al. |
| 10,516,704 B2 | 12/2019 | Baram |
| 2003/0067536 A1 | 4/2003 | Boulanger et al. |
| 2007/0083658 A1* | 4/2007 | Hanna ................. H04M 3/4285 709/227 |
| 2009/0241154 A1* | 9/2009 | Lee ..................... H04L 65/4084 725/110 |
| 2015/0215581 A1* | 7/2015 | Barzuza ................. H04L 12/18 348/14.1 |
| 2017/0287226 A1* | 10/2017 | Du ..................... G06Q 30/0241 |
| 2018/0047196 A1* | 2/2018 | Du ..................... G06F 21/6209 |
| 2019/0104326 A1 | 4/2019 | Stockhammer et al. |
| 2019/0313059 A1* | 10/2019 | Agarawala ............ H04L 67/142 |
| 2019/0392630 A1* | 12/2019 | Sturm ..................... G06V 20/36 |
| 2020/0294317 A1* | 9/2020 | Segal ..................... G06N 20/00 |
| 2021/0089475 A1* | 3/2021 | Mathur .................. G06F 3/017 |
| 2021/0090315 A1* | 3/2021 | Gladkov ................. G06F 3/017 |

OTHER PUBLICATIONS

International Search Report and Written Opinion—PCT/US2021/021820—ISA/EPO—dated Jul. 22, 2021 17 pages.
Li Y., "A Pattern of Augmented Video Services in Access Grid", Fuzzy Systems And Knowledge Discovery (FSKD), 2010 Seventh International Conference on, IEEE, Piscataway, NJ, USA, Aug. 10, 2010 (Aug. 10, 2010), pp. 2303-2307, XP031751703, ISBN: 978-1-4244-5931-5, the whole document.
Tarault A., et al., "Cluster-Based Solution for Virtual and Augmented Reality Applications", Computer Graphics and Interactive Techniques In Australasia and South East Asia, ACM, 2 Penn Plaza, Suite 701 New York NY 10121-0701 USA, Nov. 29, 2005 (Nov. 29, 2005), pp. 293-296, XP058291478, DOI: 10.1145/1101389.1101448 ISBN: 978-1-59593-201-3 the whole document.

* cited by examiner

SIGNALING OF SCENE DESCRIPTION FOR MULTIMEDIA CONFERENCING

RELATED APPLICATIONS

This application claims the benefit of priority to U.S. Provisional Application No. 62/990,895, entitled "Signaling of Scene Description For Multimedia Conferencing" filed Mar. 17, 2020, the entire contents of which are hereby incorporated herein by reference for all purposes.

BACKGROUND

Long Term Evolution (LTE), fifth generation (5G) new radio (NR), and other recently developed communication technologies allow wireless devices to communicate information at data rates (e.g., in terms of Gigabits per second, etc.) that are orders of magnitude greater than what was available just a few years ago.

Today's communication networks are also more secure, resilient to multipath fading, allow for lower network traffic latencies, provide better communication efficiencies (e.g., in terms of bits per second per unit of bandwidth used, etc.). These and other recent improvements have facilitated the emergence of the Internet of Things (JOT), large scale Machine to Machine (M2M) communication systems, autonomous vehicles, and other technologies that rely on consistent and secure communications.

In recent years augmented reality software applications that combine real-world images from a user's physical environment with computer-generated imagery or virtual objects (VOs) have grown in popularity and use. An augmented reality software application may add graphics, sounds, and/or haptic feedback to the natural world that surrounds a user of the application. Images, video streams and information about people and/or objects may be presented to the user superimposed on the visual world as an augmented scene on a wearable electronic display or head-mounted device (e.g., smart glasses, augmented reality glasses, etc.).

SUMMARY

Various aspects include systems and methods for providing an immersive three-dimensional group session. Various embodiments include methods and devices for signaling a description of a scene with media components potentially coming from different parties. In various aspects, a scene graph may be signaled through a session description protocol (SDP) during a session initiation protocol (SIP) session setup. In various aspects, the scene graph may include respective graphical output nodes assigned to be controlled by each of the plurality of participant computing devices in an immersive three-dimensional group session. Various aspects may be performed by a processor of a wireless device that is one of a plurality of participant computing devices operating in an immersive three-dimensional group session. Various aspects may include receiving a scene graph for an immersive three-dimensional group session, wherein the scene graph includes at least an own graphical output node assigned to be controlled by the wireless device and respective other graphical output nodes assigned to be controlled by each of the other of the plurality of participant computing devices, controlling components of the own graphical output node relative to a three-dimensional space of the immersive three-dimensional group session, sending the components of the own graphical output node in a first media stream to the other of the plurality of participant computing devices, receiving components of the other graphical output nodes in media streams from each of the other of the plurality of participant computing devices, and rendering the immersive three-dimensional group session on a display of the wireless device based at least in part on the components of the own graphical output node and the components of the other graphical output nodes.

Some aspects may further include receiving a scene graph update including an indication of a new participant computing device for the immersive three-dimensional group session and an indication of a new graphical output node assigned to be controlled by the new participant computing device, receiving components of the new graphical output node in a second media stream from the new participant computing device, and rendering the immersive three-dimensional group session on the display of the wireless device based at least in part on the components of the own graphical output node, the components of the other graphical output nodes, and the components of the new graphical output node.

Some aspects may further include receiving a session description protocol (SDP) for the immersive three-dimensional group session indicating an address of a data channel over which the scene graph will be shared, wherein receiving the scene graph includes downloading the scene graph via the data channel.

Some aspects may further include sending an offer to send or to receive the scene graph to the other of the plurality of participant computing devices as part of session initiation protocol (SIP) setup for the immersive three-dimensional group session.

Some aspects may further include sending an offer to send or to receive the scene graph to the other of the plurality of participant computing devices, wherein the offer indicates the own graphical output node.

In some aspects, the immersive three-dimensional group session is a Web Real-Time Communications (WebRTC) session.

In some aspects, controlling components of the own graphical output node relative to the three-dimensional space of the immersive three-dimensional group session may include controlling components of the own graphical output node based at least in part on a determined position of the wireless device relative to the three-dimensional space of the immersive three-dimensional group session.

In some aspects, controlling components of the own graphical output node based at least in part on the determined position of the wireless device relative to the three-dimensional space of the immersive three-dimensional group session may include controlling components of the own graphical output node based at least in part on the determined position of the wireless device relative to the three-dimensional space of the immersive three-dimensional group session and a determined orientation of the wireless device relative to the three-dimensional space of the immersive three-dimensional group session.

Further aspects may include a wireless device having a processor configured to perform one or more operations of any of the methods summarized above. Further aspects may include a non-transitory processor-readable storage medium having stored thereon processor-executable instructions configured to cause a processor of a wireless device to perform operations of any of the methods summarized above. Further aspects include a wireless device having means for performing functions of any of the methods summarized above. Further aspects include a system on chip for use in a wireless device that includes a processor configured to perform one or more operations of any of the methods summarized above. Further aspects include a system in a package that includes two systems on chip for use in a wireless device that includes a processor configured to perform one or more operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1A:
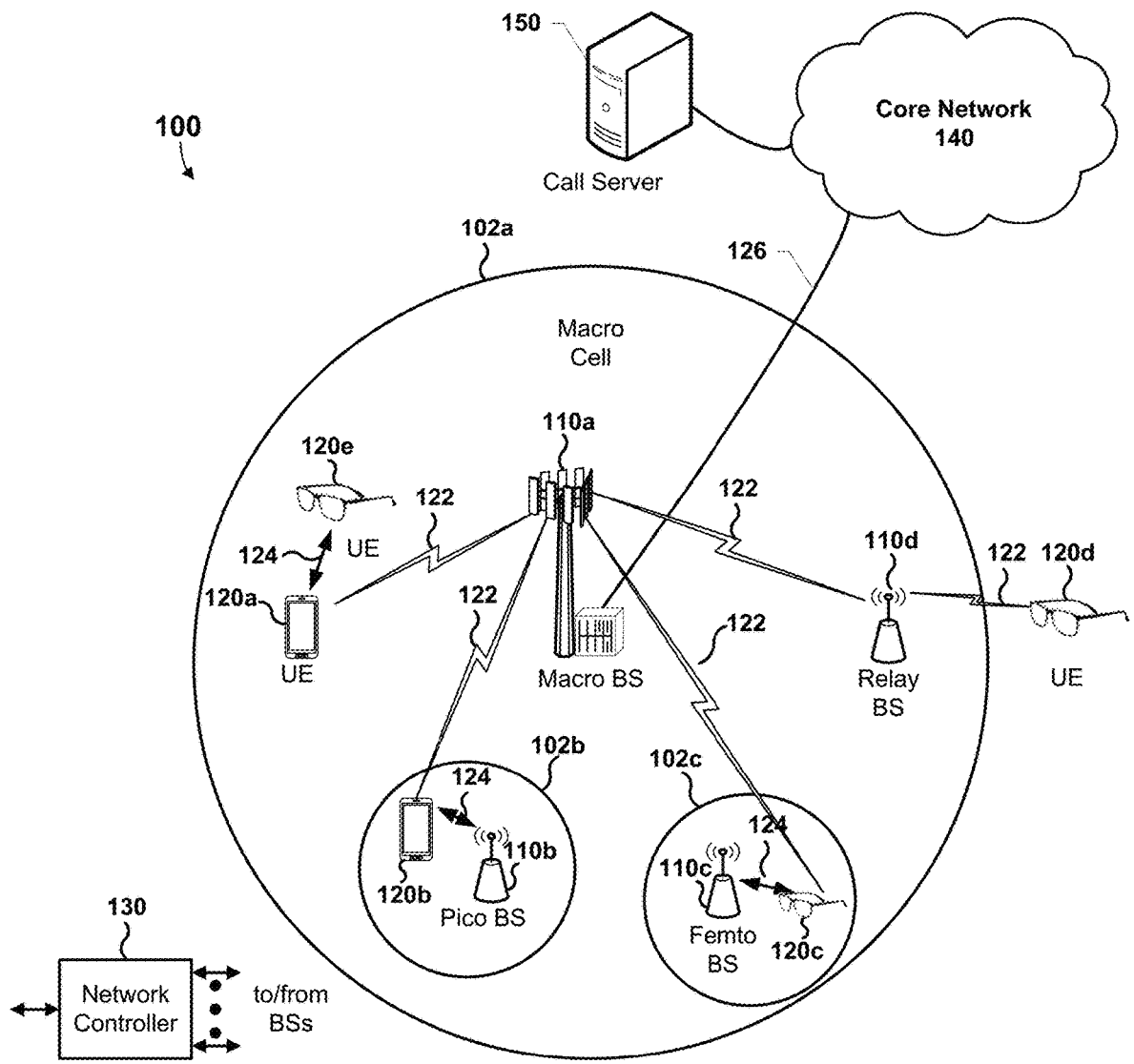
FIG. 1A is a system block diagram illustrating an example communication system suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments may enable an immersive three-dimensional group session for a plurality of participant computing devices in which a scene graph may include respective graphical output nodes assigned to be controlled by each of the plurality of participant computing devices in the immersive three-dimensional group session. Various embodiments may enable the plurality of participant computing devices to share media streams of components of their respective assigned graphical output nodes with one another in the immersive three-dimensional group session. By assigning each participant computing device control of its own respective graphical output node in the immersive three-dimensional group session and sharing media streams of the components of the graphical output nodes among the participant computing devices, various embodiments may support rendering the immersive three-dimensional group session with a shared three-dimensional space in which each participant computing device controls its own respective three-dimensional object in the shared three-dimensional space.

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palm-top computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

Various embodiments may be implemented in devices that are capable of transmitting and receiving RF signals according to any of the Institute of Electrical and Electronics Engineers (IEEE)16.11 standards, or any of the IEEE 802.11 standards, the Bluetooth® standard (e.g., Bluetooth 4, Bluetooth 5, etc.), code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as an IEEE 802.15.4 protocol (for example, Thread, ZigBee, and Z-Wave), 6LoWPAN, Bluetooth Low Energy (BLE), LTE Machine-Type Communication (LTE MTC), Narrow Band LTE (NB-LTE), Cellular IoT (CIoT), Narrow Band IoT (NB-IoT), BT Smart, Wi-Fi (e.g., Wi-Fi NAN, etc.), LTE-U, LTE-Direct, MuLTEfire, as well as relatively extended-range wide area physical layer interfaces (PHYs) such as Random Phase Multiple Access (RPMA), Ultra Narrow Band (UNB), Low Power Long Range (LoRa), Low Power Long Range Wide Area Network (LoRaWAN), Weightless, or a system utilizing 3G, 4G or 5G, Cellular V2X or further implementations thereof, technology.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

Various embodiments are described herein using the term "server" to refer to any computing device capable of functioning as a server, such as a master exchange server, web server, mail server, document server, content server, or any other type of server. A server may be a dedicated computing device or a computing device including a server module (e.g., running an application that may cause the computing device to operate as a server). A server module (e.g., server application) may be a full function server module, or a light or secondary server module (e.g., light or secondary server application) that is configured to provide synchronization services among the dynamic databases on receiver devices. A light server or secondary server may be a slimmed-down version of server-type functionality that can be implemented on a receiver device thereby enabling it to function as an Internet server (e.g., an enterprise e-mail server) only to the extent necessary to provide the functionality described herein.

The phrase "head-mounted device" and the acronym (HMD) is used herein to refer to any electronic display system that is wearable and presents the user with at least some computer-generated imagery. HMDs may present just computer-generated imagery or a combination of computer-generated imagery and real-world images from a user's physical environment (i.e., what the user would see without the glasses). HMDs may enable the user to view the generated image in the context of the real-world scene. Non-limiting examples of head-mounted devices include, or may be included in, helmets, eyeglasses, virtual reality glasses, augmented reality glasses, electronic goggles, and other similar technologies/devices. A head-mounted device may include various hardware elements, such as a processor, a memory, a display, one or more cameras (e.g., world-view camera, gaze-view camera, etc.), and a wireless interface for connecting with the Internet, a network, or another computing device. In some embodiments, the head-mounted device processor may be configured to perform or execute an augmented reality software application.

In some embodiments a head-mounted device may be an accessory for and/or receive information from a wireless device (e.g., desktop, laptop, Smartphone, tablet computer, etc.), with all or portions of the processing being performed on the processor of that wireless device. As such, in various embodiments, the head-mounted device may be configured to perform all processing locally on the processor in the head-mounted device, offload all of the main processing to a processor in another computing device (e.g. a laptop present in the same room as the head-mounted device, etc.), or split the main processing operations between the processor in the head-mounted device and the processor in the other computing device. In some embodiments, the processor in the other computing device may be a server in "the cloud" with which the processor in the head-mounted device or in an associated wireless device communicates via a network connection (e.g., a cellular network connection to the Internet).

Telepresence services are becoming more capable, allowing for composition of several objects into a single immersive environment, that the participants of the conference can navigate and interact with more freely. The current session description protocol (SDP) is limited in terms of support for describing rich compositions and does not provide any tools to support immersive telepresence environments. On specific type of telepresence or teleconference implementation is an immersive three-dimensional group session. In an immersive three-dimensional group session, each participant computing device in the session may render a three-dimensional graphical display of the session on its respective display, such that each participant user in the immersive three-dimensional group session is presented a virtual reality (VR) view of the three-dimensional space of the immersive three-dimensional group session. Three-dimensional objects, such as avatars, characters, etc., representing the participants of the immersive three-dimensional group session may be viewed by each participant and appear to move within the three-dimensional space of the immersive three-dimensional group session.

Support of Immersive Teleconferencing and Telepresence for Remote Terminals (ITT4RT) is a standard being developed to facilitate immersive multi-computing device virtual reality (VR) video conferencing, such as immersive three-dimensional group sessions. ITT4RT use cases include composition of captured VR video, e.g. from a conference room, and other content, such as two-dimensional (2D) video slides or the like. Work item descriptions related to ITT4RT have indicated that ITT4RT is working toward enabling scenarios with two-way audio and one-way immersive video, e.g., a remote single user wearing an HMD participates to a conference will send audio and optionally 2D video (e.g., of a presentation, screen sharing and/or a capture of the user itself).

The complexity of VR scenes poses challenges for conventional session description protocol (SDP) signaling and can become unmanageable very quickly, such as when many remote users sharing and composing their own content into the scene. The SDP is simply not designed to carry scene description information. Various embodiments provide a solution to such problems by providing an embodiment solution based on scene description to support composition and overlays. Various embodiments provide methods and devices for signaling a description of a scene with media components potentially coming from different parties. In various embodiments, the scene description may be signaled through the SDP during the session initiation protocol (SIP) session setup. In various embodiments, the scene description may link to other media streams in the session, e.g., to leverage them as texture for overlays in the immersive conferencing scene, etc.

A scene graph is a directed acyclic graph, usually just a plain tree-structure, that represents an object-based hierarchy of the geometry of a scene. The leaf nodes of the graph represent geometric primitives such as polygons. Each node in the graph holds pointers to its children. The child nodes can, among other things, be a group of other nodes, a geometry element, a transformation matrix, etc. Spatial transformations are attached to nodes of the graph and represented by a transformation matrix. This structure of scene graphs has the advantage of reduced processing complexity, such as while traversing the graph for rendering. An example operation that is simplified by the graph representation is the culling operation in which branches of the graph are dropped from processing if deemed that the parent node's space is not visible or relevant to the rendering of the current view frustum (referred to as level of detail culling). A scene graph may include various types of nodes, such as visual output nodes, audio source nodes, graphical output nodes, shared content nodes, etc. As a specific example, graphical output nodes may define three-dimensional objects to be output in a three-dimensional space defined by a scene graph.

Graphics Library (GL) Transmission Format (TF)(glTF) 2.0 (glTF 2.0) is a new standard that was developed by Khronos to enable Physically Based Rendering. glTF 2.0 offers a compact and low-level representation of a scene graph. glTF 2.0 offers a flat hierarchy of the scene graph representation to simplify the processing. glTF 2.0 scene graphs are represented in JavaScript Object Notation (JSON) to ease the integration in web environments. The glTF 2.0 specification is designed to eliminate redundancy in the representation and to offer efficient indexing of the different objects in the scene graph. The Moving Pictures Expert Group (MPEG) is working on extensions to glTF 2.0 to add support for real-time media, scene updates, and other features.

Scene graphs may enable composing scenes (also referred to as spaces, such as three-dimensional spaces) for an immersive presentation, such as an immersive three-dimensional group session, in various embodiments. In some embodiments, the composition may be performed at a call server, such as a multimedia resource function (MRF), multipoint communication unit (MCU), a telepresence application server, etc. Alternatively, in some embodiments, a designated computing device participating in the conference may be responsible for creating the initial scene graph and sharing the scene graph with all other parties in the call (e.g., the immersive three-dimensional group session). This computing device may be the one that creates the main VR content, such as the computing device that is in the conference room with a VR capture. In some embodiments, each computing device participating in the conference (e.g., the immersive three-dimensional group session) may contribute one or more nodes to the scene graph. In some embodiments, each node may identify or be assigned its associated transformation (e.g., in form of a matrix, or individual translation and rotation operations) to place that node appropriately in the scene (or space), for example to place the node appropriately in a three-dimensional space.

In some embodiments, each computing device participating in a conference call (e.g., an immersive three-dimensional group session) may offer to send and receive a scene graph through a session level attribute. In some embodiments, the offer may indicate the own graphical output node or nodes owned by the computing device sending the offer. As an example, each computing device participating in the conference call (e.g., the immersive three-dimensional group session) may offer to send and receive a scene graph through the following session-level attribute given in augmented Backus-Naur Form (ABNF) syntax:
Session-Description "a=scene-description:" SP mime-type [SP Uri] [SP sent-nodes] CRLF
mime-type="mime-pe:" byte-string
sent-nodes="nodes-owned=1*(byte-string ";")
uri="websocket-uri:"URI.

In some embodiments, the Uniform Resource Indicator (URI) parameter may be a WebSocket URI for a data channel over which the scene graph will be shared and updated. Alternatively, an application media session may be used with a protocol identifier, such as the following protocol identifier TCP/WSS/SD (Transmission Control Protocol/Websocket Secure/Session Description).

In some embodiments, the WebSocket URI may be provided in accordance with the syntax and offer/answer negotiation as defined in Internet Engineering Task Force (IETF) Request for Comments (RFC) 8124. An example schema of such the WebSocket URI provisioning may be:
m=application 50000 TCP/WSS/SD*
a=setup:passive
a=connection:new
a=websocket-uri:wss://mrf.operator.com/call/21323asd23
a=mime-type:model/gltf+json
a=nodes-owned: node12,node13,node14

In various embodiments, the scene graph references media streams from the conferencing session that are used as components of nodes in the scene (e.g., the three-dimensional space). An example is a video stream of a conference participant that is to be displayed in a rectangular region in the three-dimensional (3D) scene (also referred to as the 3D space). For example, the following URI format may be used:
url="itp://" fqdn_or_ip "/" call_id "/" ssrc "/" mid In this URI format, "fqdn_or_ip" represents the domain name or Internet protocol (IP) address of the MRF or SIP proxy that manages the call (e.g., the immersive three-dimensional group session). If no MRF or SIP proxy manages the call (e.g., the immersive three-dimensional group session), "fqdn_or_ip" may represent the domain name or IP address of the SIP address of the host of the call (e.g., the immersive three-dimensional group session). "call_id" provides a unique identifier for the current call or conference (e.g., the current immersive three-dimensional group session). "ssrc" represents the synchronization source of the owner/sending participant of the media stream. Finally, "mid" represents media session identifier as provided in the SDP. Other forms of addressing may be defined, e.g., as uniform resource names (URNs).

In some embodiments, when using Web Real-Time Communications (WebRTC), the session setup protocol may be left to the application. Several implementations rely on SIP over WebSockets for this purpose. However, other protocols may be used to setup and describe the call (e.g., the immersive three-dimensional group session).

Some embodiments may use the scene graph as the entry point to the conference call (e.g., the immersive three-dimensional group session). In such embodiments, all participants share a scene graph document that sets up the three-dimensional scene (or three-dimensional space) at the start of the call (e.g., the immersive three-dimensional group session). The scene graph will define the graph nodes for each participant and identify components each participant needs to provide media streams for. This can be done by a central call server, such as an MRF, to which all conference participants connect. The MRF may be configured to update the scene graph during the call (e.g., the immersive three-dimensional group session), such as to add new nodes or remove nodes of newly joining call participants or of participants that left the call.

In some embodiments the participant computing devices may use a link to a web page provided by a call server to join the WebRTC conference. The call server may provide the participant computing devices with the web page together with a scene graph file that sets up the initial/default arrangement in 3D space of the call participants and material (e.g., each participant will be assigned a visual node, an audio source node, and potentially also a node for graphics and other shared content). Each participant computing device may add or modify the nodes that it owns in the scene graph. The media streams that provide the components for the nodes in the scene graph may be streamed using WebRTC. These streams may be exchanged directly or through a server, such as a media proxy server.

In some embodiments, computing devices participating in an ITT4RT conference may establish direct peer-to-peer WebSocket channels with each other or a connection may be offered by an MRF to all parties. In such embodiments, the WebSocket channel may use the text frame format. In a scene (e.g., in a three-dimensional space), node names may be unique and may be declared in the SDP to ensure there are no naming conflicts in nodes provided by different computing devices in a call. In such embodiments, nodes in the scene graph may reference external media streams, such as other media streams that are declared in the SDP. In such embodiments, a receiver may mask nodes from certain computing devices in the rendering process, such as based on user input.

In some embodiments, the MRF may, by default, be the owner of the master scene graph, that is the computing device that sets the coordinate system and in which all other nodes are composited. In some embodiments, the MRF may also the computing device that defines the main camera in the scene (or space). In some embodiments, in the absence of a centralized MRF, the computing devices in the call may select one computing device to provide the main scene graph, for example by selecting the computing device that provides the VR content or the organizer of the call. In various embodiments, overlays can be 2D or 3D objects that are placed within the scene (or space). In some embodiments, the geometry of the overlay and its texture may be defined by the node that corresponds to that overlay object. A simple example is a set of slides that are played in a rectangular area that is shown inside the VR scene (or VR space). In this example, the geometry may be a rectangle and the texture may come from a video media stream. The rectangle may be placed in the scene (or space). For viewport-dependent overlay, the position of the rectangle may be locked to the camera direction.

FIG. 1A illustrates an example of a communications system 100 that is suitable for implementing various embodiments. The communications system 100 may be an 5G NR network, or any other suitable network such as an LTE network.

The communications system 100 may include a heterogeneous network architecture that includes a core network 140 and a variety of wireless devices (also referred to as user equipment (UE) computing devices) (illustrated as wireless device 120a-120e in FIG. 1). The communications system 100 may also include a number of base stations (illustrated as the BS 110a, the BS 110b, the BS 110c, and the BS 110d) and other network entities. A base station is an entity that communicates with wireless devices (wireless devices or UE computing devices), and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by wireless devices with service subscription. A pico cell may cover a relatively small geographic area and may allow unrestricted access by wireless devices with service subscription. A femto cell may cover a relatively small geographic area (for example, a home) and may allow restricted access by wireless devices having association with the femto cell (for example, wireless devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1A, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120a-120e (UE computing device) may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a wireless device) and send a transmission of the data to a downstream station (for example, a wireless device or a base station). A relay station also may be a wireless device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices (UE computing devices) 120a, 120b, 120c may be dispersed throughout communications system 100, and each wireless device may be stationary or mobile. A wireless device also may be referred to as an access terminal, a UE, a terminal, a mobile station, a subscriber unit, a station, etc.

A macro base station 110a may communicate with the communication network 140 over a wired or wireless communication link 126. The wireless devices 120a, 120b, 120c may communicate with a base station 110a-110d over a wireless communication link 122. The core network 140 may be connected to other devices, such as a call server 150 (e.g., a multimedia resource function (MRF), multipoint communication unit (MCU), a telepresence application server, etc.). In this manner, via the connections to the core network 140, the call server 150 may make telepresence services, such as Immersive Teleconferencing and Telepresence for Remote Terminals (ITT4RT) services, available to wireless devices 120a, 120b, 120c, 120d, (e.g., from the core network 140 via the link 126 and from the base stations 110a-110d via the link 122). While illustrated as outside the core network 140, the call server 150 may be part of the core network 140 itself.

The wireless communication links 122, 124 may include a plurality of carrier signals, frequencies, or frequency bands, each of which may include a plurality of logical channels. The wireless communication links 122 and 124 may utilize one or more radio access technologies (RATs). Examples of RATs that may be used in wireless wide area network (WWAN) wireless communication links 122, 124 within a disbursed communication system 100 include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Examples of RATs that may be used in wireless local area network (WLAN) wireless communication links 122, 124 within a local communication system 100 include medium range wireless protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some wireless devices may be considered machine-type communication (MTC) or evolved or enhanced machine-type communication (eMTC) wireless devices. MTC and eMTC wireless devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some wireless devices may be considered Internet-of-Things (IoT) devices or may be implemented as NB-IoT (narrowband Internet of things) devices. A wireless device 120a-e may be included inside a housing that houses components of the wireless device, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

In some implementations, two or more wireless devices 120a-e (for example, illustrated as the wireless device 120a and the wireless device 120e) may communicate directly using one or more sidelink channels 124 (for example, without using a base station 110a-110d as an intermediary to communicate with one another). For example, the wireless devices 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-e may perform scheduling operations, resource selection operations, as well as other operations described elsewhere herein as being performed by the base station 110a.

Figure 1B:
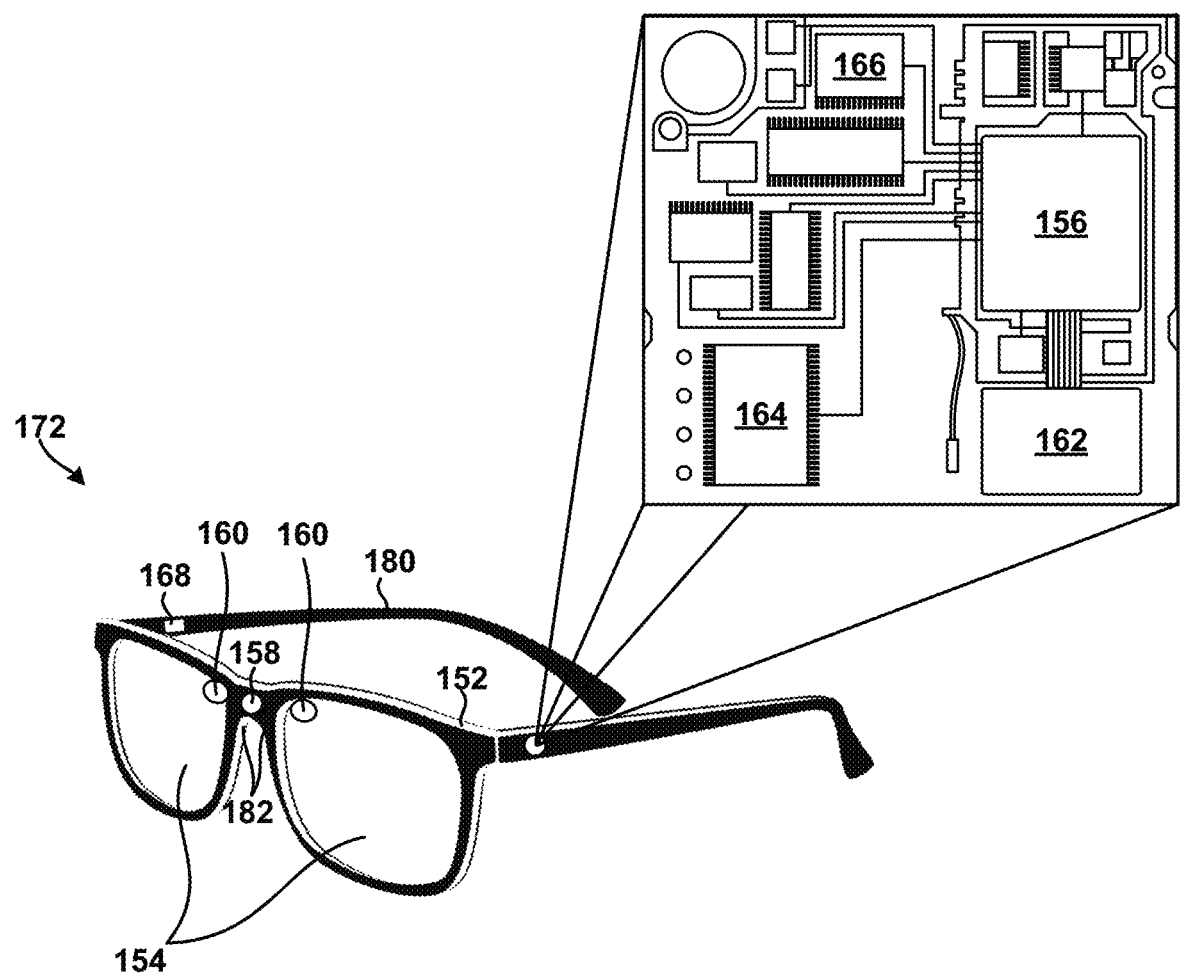
FIG. 1B is an illustration of a head-mounted device (e.g., augmented reality glasses) that may implement various embodiments.

FIG. 1B illustrates that a head-mounted device 172 that may be configured in accordance with the various embodiments. With reference to FIGS. 1A and 1B, in the example illustrated in FIG. 1A, the head-mounted device 172 may be a specific implementation of a user equipment computing device (e.g., UE 120c, 120d, 120e). The head-mounted device 172 includes a frame 152, two optical lenses 154, and a processor 156 that is communicatively coupled to outward facing world-view image sensors/cameras 158, inward facing gaze-view sensors/cameras 160, a sensor array 162, a memory 164, and communication circuitry 166. In various embodiments, the communication circuitry 166 may support one or more RATs to support communications among various devices as described in system 100 with reference to FIG. 1A. In some embodiments, the head-mounted device 172 may include capacitance touch sensing circuits along the arms 180 of the frame or in a nose bridge 182 of the head-mounted device 172. In some embodiments, the head-mounted device 172 may also include sensors for monitoring physical conditions (e.g., location, motion, acceleration, orientation, altitude, etc.). The sensors may include any or all of a gyroscope, an accelerometer, a magnetometer, a magnetic compass, an altimeter, an odometer, and a pressure sensor. The sensors may also include various bio-sensors (e.g., heart rate monitor, body temperature sensor, carbon sensor, oxygen sensor, etc.) for collecting information pertaining to environment and/or user conditions. The sensors may also be external to the head-mounted device 172 and paired or grouped to the head-mounted device 172 via a wired or wireless connection (e.g., Bluetooth®, etc.).

In some embodiments, the processor 156 may also be communicatively coupled to an image rendering device 168 (e.g., an image projector), which may be embedded in aim portions 180 of the frame 152 and configured to project images onto the optical lenses 154. In some embodiments, the image rendering device 168 may include a light-emitting diode (LED) module, a light tunnel, a homogenizing lens, an optical display, a fold mirror, or other components well known projectors or head-mounted displays. In some embodiments (e.g., those in which the image rendering device 168 is not included or used), the optical lenses 154 may be, or may include, see-through or partially see-through electronic displays. In some embodiments, the optical lenses 154 include image-producing elements, such as see-through Organic Light-Emitting Diode (OLED) display elements or liquid crystal on silicon (LCOS) display elements. In some embodiments, the optical lenses 154 may include independent left-eye and right-eye display elements. In some embodiments, the optical lenses 154 may include or operate as a light guide for delivering light from the display elements to the eyes of a wearer.

The outward facing or world-view image sensors/cameras 158 may be configured to capture real-world images from a user's physical environment, and send the corresponding image data to the processor 156. The processor 156 may combine the real-world images with computer-generated imagery or virtual objects (VOs) to generate an augmented scene (or space), and render the augmented scene (or space) on the electronic displays or optical lenses 154 of the head-mounted device 172.

The inward facing or gaze-view sensors/cameras 160 may be configured to acquire image data from the user's eyes or the facial structure surrounding the user's eyes.

Figure 2:
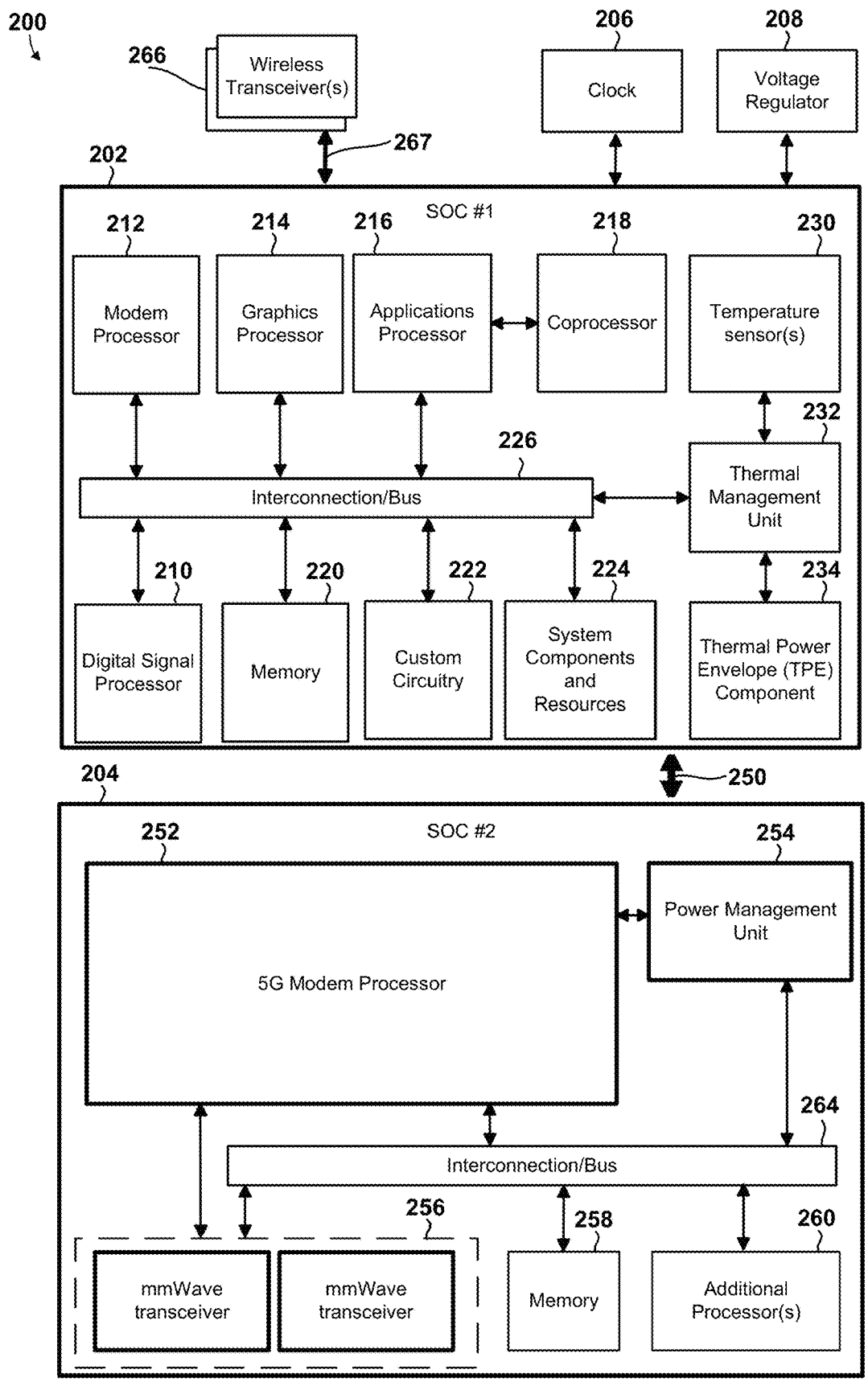
FIG. 2 is a component block diagram illustrating an example computing and wireless modem system suitable for implementing various embodiments.

Various embodiments may be implemented on a number of single processor and multiprocessor computer systems, including a system-on-chip (SOC) or system in a package (SIP). FIG. 2 illustrates an example computing system or SIP 200 architecture that may be used in wireless devices (UE computing devices) implementing the various embodiments.

With reference to FIGS. 1A, 1B, and 2, the illustrated example SIP 200 includes a two SOCs 202, 204, a clock 206, a voltage regulator 208, and one or more wireless transceivers 266 configured to send and receive wireless communications via an antenna (not shown) to/from network wireless devices, such as a base station 110a, and/or other wireless device (e.g., wireless devices 120a-e). In some embodiments, the first SOC 202 operate as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications. In some embodiments, the wireless transceivers 266 may be wireless transceivers configured to support peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), Bluetooth communications, Wi-Fi communications, etc. In some embodiments, the wireless transceivers 266 may each be connected to the first SOC 202 and/or the second SOC 204 may be connected to each of one or more wireless transceivers 266 by various physical connections 267 (also referred to as interconnects, buses, etc.), such as peripheral component interconnect express (PCIe) connections, universal serial bus (USB) connections, high speed inter-chip (HSIC) connections, Ethernet connections, etc.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
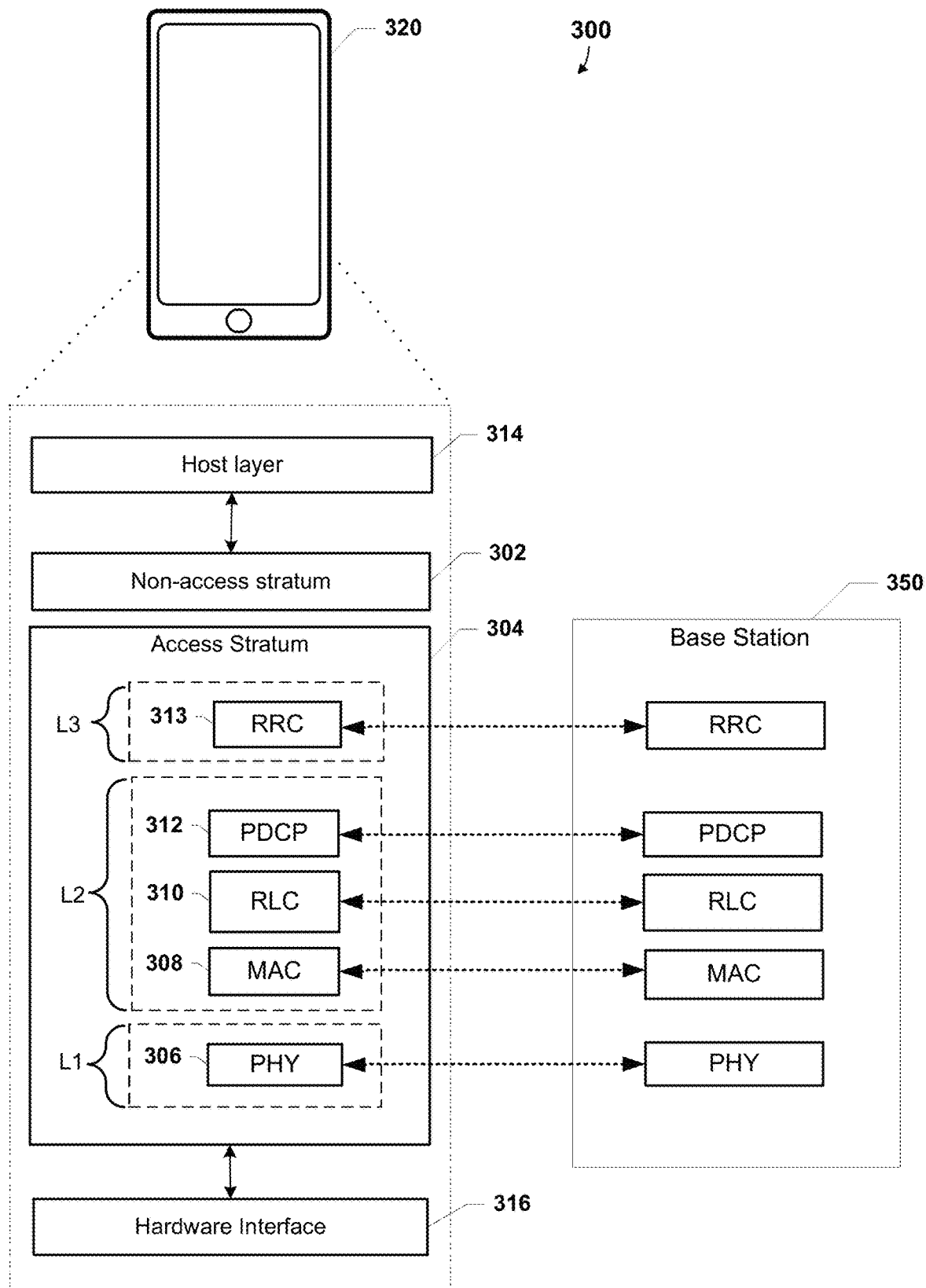
FIG. 3 is a diagram illustrating an example of a software architecture including a radio protocol stack for the user and control planes in wireless communications in accordance with various embodiments.

FIG. 3 illustrates an example of a software architecture 300 including a radio protocol stack for the user and control planes in wireless communications between a base station 350 (e.g., the base station 110a) and a wireless device (UE computing device) 320 (e.g., the wireless device 120a-120e, 172, 200). With reference to FIGS. 1A-3, the wireless device 320 may implement the software architecture 300 to communicate with the base station 350 of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (e.g., SIM(s) 204) and its core network 140. The AS 304 may include functions and protocols that support communication between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In the various embodiments, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various embodiments, the RRC sublayer 313 may provide functions INCLUDING broadcasting system information, paging, and establishing and releasing an RRC signaling connection between the wireless device 320 and the base station 350.

In various embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and the general purpose processor 206.

In other embodiments, the software architecture 300 may include one or more higher logical layer (e.g., transport, session, presentation, application, etc.) that provide host layer functions. For example, in some embodiments, the software architecture 300 may include a network layer (e.g., IP layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4:
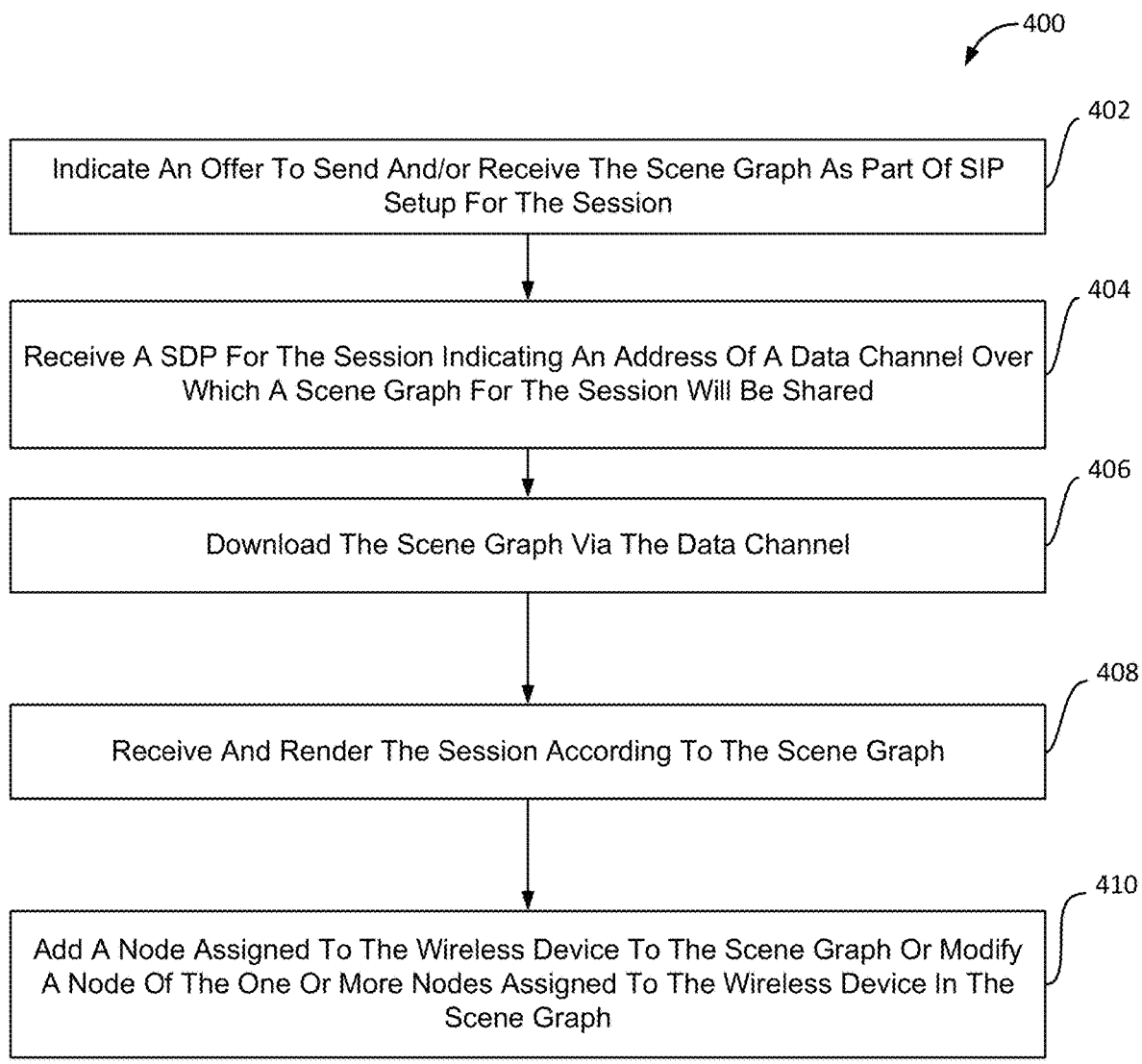
FIG. 4 is a process flow diagram illustrating a method for supporting an immersive experience in a teleconference or telepresence session in accordance with various embodiments.

FIG. 4 shows a process flow diagram of an example method 400 for supporting an immersive experience in a teleconference or telepresence session according to various embodiments. With reference to FIGS. 1A-4, the method 400 may be implemented by a processor (such as 156, 212, 216, 252 or 260) of a wireless device (such as the wireless device 120a-120e, 172, 200, 320). In various embodiments, the operations of method 400 may be performed by a processor of a wireless device that is one of a plurality of participant computing devices in a teleconference or telepresence session, such as an immersive three-dimensional group session.

In block 402, the process may perform operations to indicate an offer to send and/or receive the scene graph as part of session initiation protocol (SIP) setup for the session. In some embodiments, the offer may indicate the graphical output nodes owned by the wireless device. In some embodiments, the session may be a WebRTC session.

In block 404, the processor may perform operations to receive a session description protocol (SDP) for the session indicating an address of a data channel over which a scene graph for the session will be shared. In some embodiments, the scene graph may define one or more nodes assigned to each computing device participating in the session. In various embodiments, the nodes may reference other media streams from the other computing devices participating in the session, and the other media streams may be overlaid in the session. In various embodiments, the one or more nodes assigned to each computing device participating in the session may include one or more visual nodes, audio source nodes, graphics nodes, or shared content nodes.

In block 406, the processor may perform operations to download the scene graph via the data channel.

In block 408, the processor may perform operations to receive and render the session according to the scene graph for rendering on an image rendering device (e.g., 168). Receiving and rendering the session may include receiving a streaming service of the session according to the scene graph and rendering the session on a display. In some embodiments, the display of the session may be rendered on an HMD (e.g., 172), on a TV conference room, on a volumetric display, or on any other image and sound rendering device, and receiving and rendering may include outputting the session to a user via the image and sound rendering device.

In block 410, the processor may perform operations to add a node assigned to wireless device to the scene graph or modify a node of the one or more nodes assigned to the wireless device in the scene graph.

Figure 5:
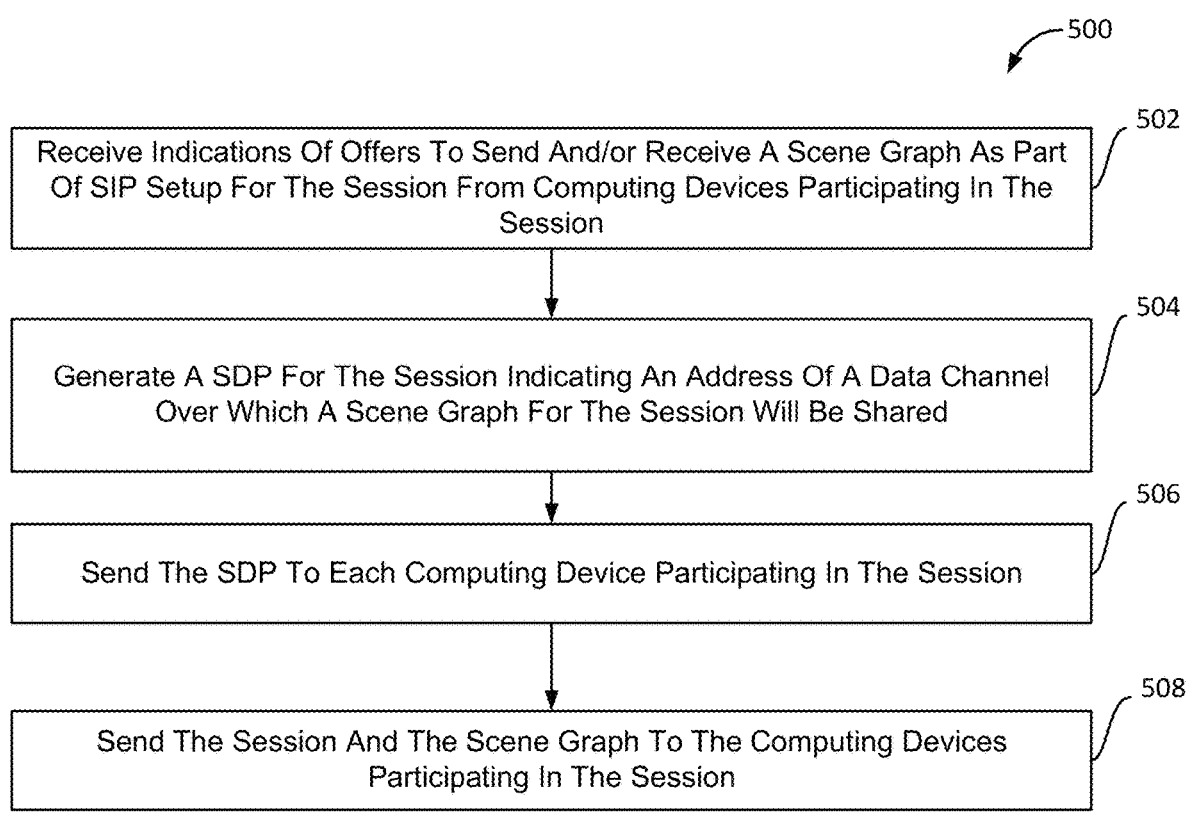
FIG. 5 is a process flow diagram illustrating a method for supporting an immersive experience in a teleconference or telepresence session in accordance with various embodiments.

FIG. 5 shows a process flow diagram of an example method 500 for supporting an immersive experience in a teleconference or telepresence session according to various embodiments. With reference to FIGS. 1A-5, the method 500 may be implemented by a processor (such as 156, 212, 216, 252 or 260) of a wireless device (such as the wireless device 120a-120e, 172, 200, 320) and/or a call server (such as call server 150). In various embodiments, the operations of the method 500 may be performed by a processor of a host computing device hosting a teleconference or telepresence session. In some embodiments, the host computing device may be a separate call server, such as a MRF, MCU, teleconferencing application server, etc. In some embodiments, the host computing device may be a wireless device that is one of a plurality of computing devices participating in a teleconference or telepresence session, such as an immersive three-dimensional group session. In various embodiments, the operations of the method 500 may be performed in conjunction with the operations of the method 400.

In block 502, the processor of the host computing device may perform operations to receive indications of offers to send and/or receive a scene graph as part of session initiation protocol (SIP) setup for the session from computing devices participating in the session. In some embodiments, the session may be a WebRTC session. In some embodiments, the received indications may indicate the graphical output nodes owned by the wireless device sending the indication of the offer.

In block 504, the processor of the host computing device may perform operations to generate a session description protocol (SDP) for the session indicating an address of a data channel over which a scene graph for the session will be shared. In some embodiments, the scene graph may define one or more nodes assigned to each computing device participating in the session.

In block 506, the processor of the host computing device may perform operations to send the SDP to the computing devices participating in the session.

In block 508, the processor of the host computing device may perform operations to send the session and the scene graph to the computing devices participating in the session. As an example, the host computing device may perform operations to stream the session and the scene graph to the computing devices participating in the session. In various embodiments, the computing devices participating in the session may be a HMD (e.g., 172), a TV in a conference room, a volumetric display, or on any other image and sound rendering device, and sending the session and/or the scene graph may include sending the session and/or the scene graph such that the computing devices participating in the session can output the session to a user on an image and sound rendering device.

Figure 6:
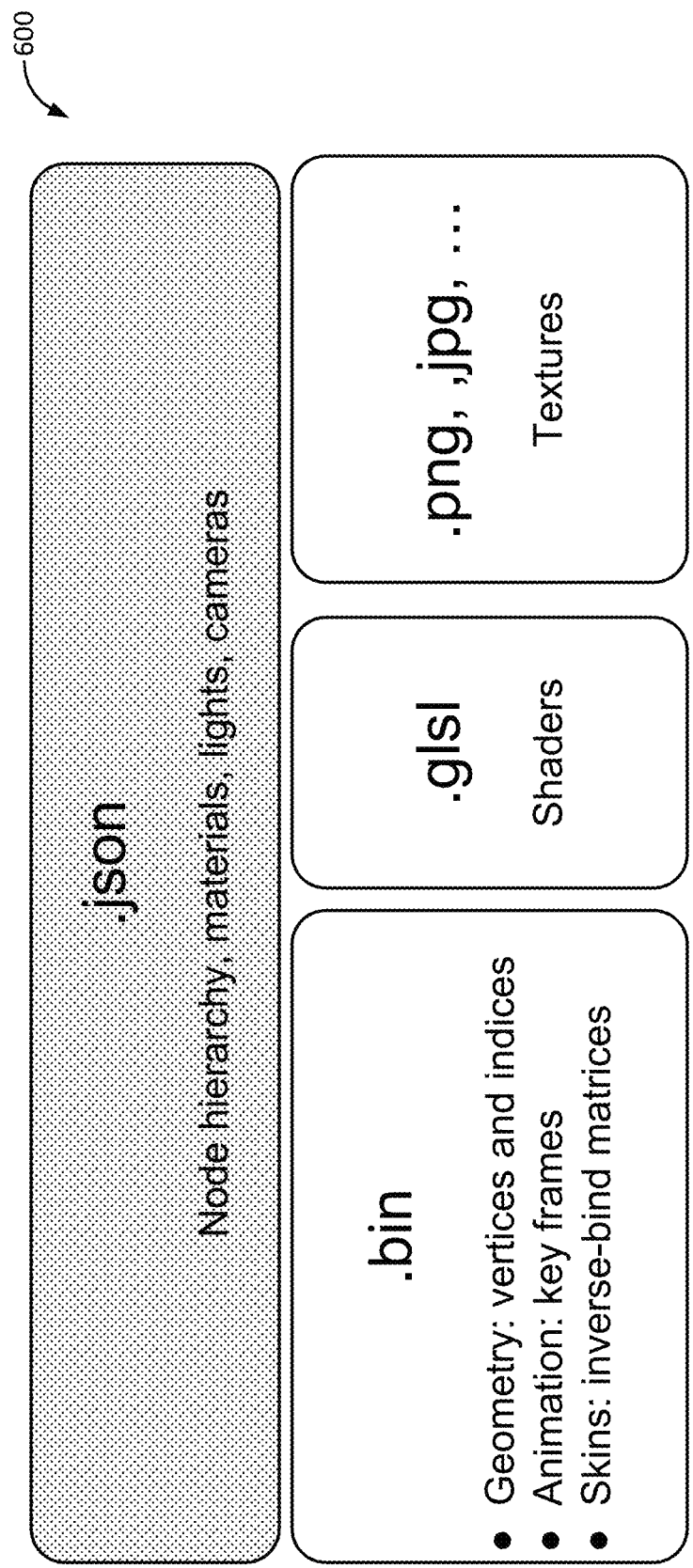
FIG. 6 illustrates an arrangement of a scene graph document in glTF2.0.

FIG. 6 illustrates an arrangement of a scene graph document 600 in glTF 2.0 suitable for use in various embodiments. With reference to FIGS. 1A-6, in various embodiments the scene graph document 600 may be part of a scene graph. The scene graph document 600 may include a JSON element defining node hierarchies, material description, lighting information, camera information, etc. The scene graph document 600 may include binary files (BINs) defining geometry information, such as vertices and indices, animation information, such as key frames, skin information, such as inverse-bind matrices, etc. The scene graph document 600 may include GL shading library (glSL) files defining shader information. The scene graph document 600 may include various other types of files, such as portable network graphics (PNG) files, Joint Photographic Experts Group (JPEG) files, etc., defining other information for the scene graph, such as textures, etc.

Figure 7:
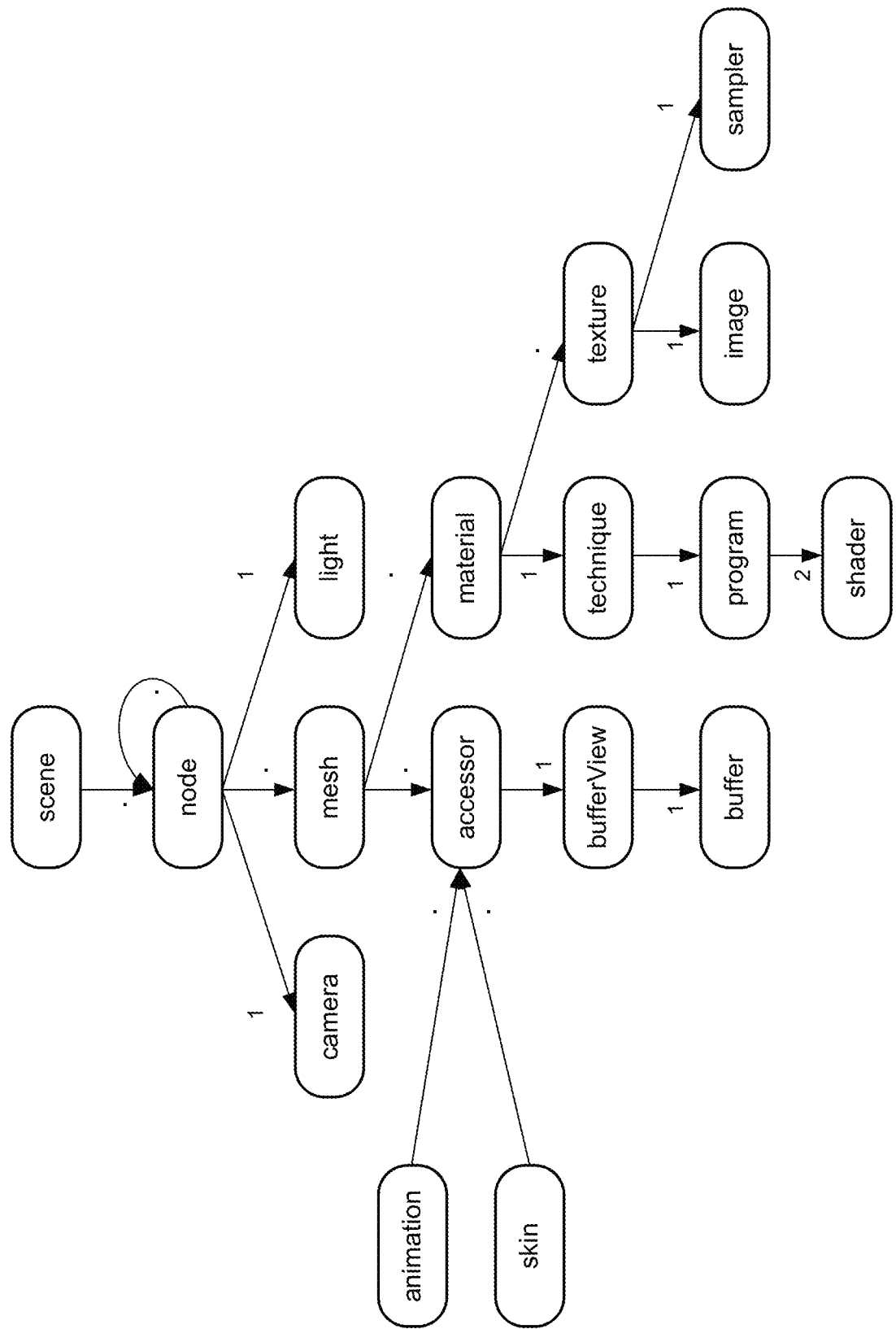
FIG. 7 illustrates a structure of a scene graph.

FIG. 7 illustrates a structure of a scene graph suitable for use in various embodiments. With reference to FIGS. 1A-7, in various embodiments the scene graph may include multiple nodes. Each node may include child nodes describing various components of the node, such as camera views, mesh information, lighting information, etc. The scene graph may define hierarchical relationships between attributes to render the mesh of the node, such as accessories, skins, buffer views, buffer information, materials, techniques, programs, shaders, textures, images, and samplers as illustrated in FIG. 7.

Figure 8:
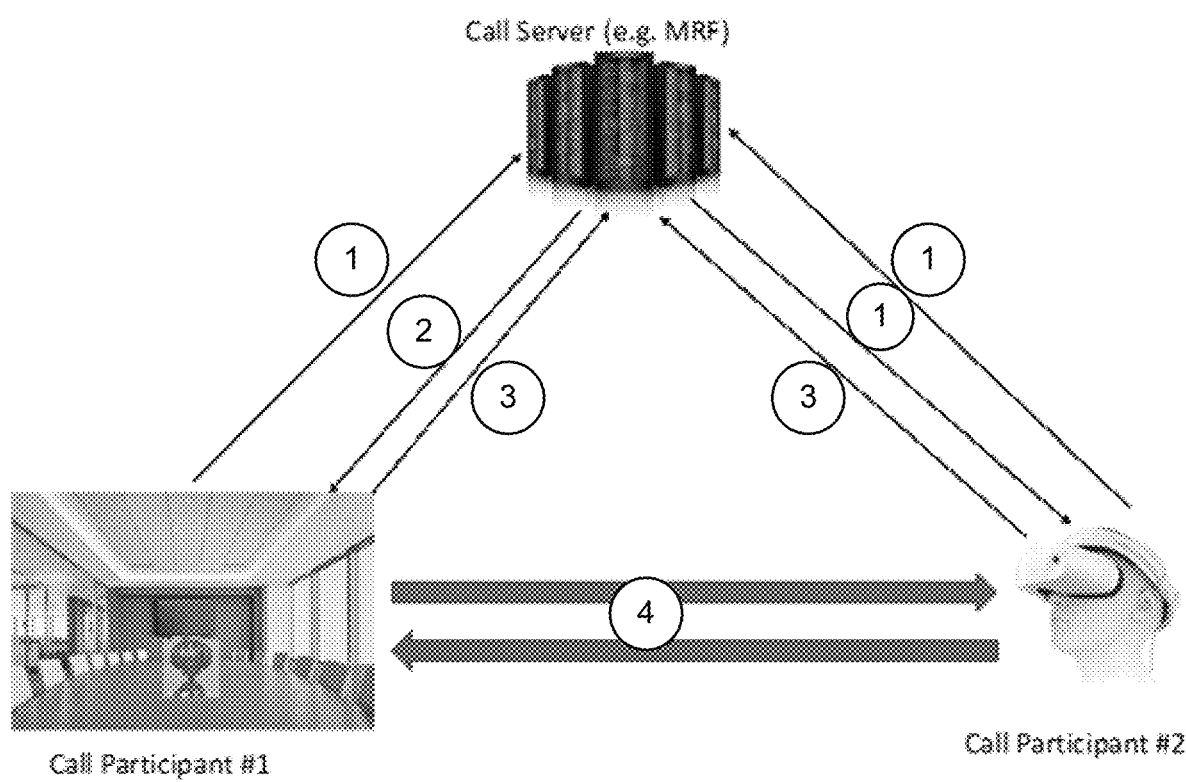
FIG. 8 is a call flow diagram illustrating operations to support an immersive experience in a teleconference or telepresence session in accordance with various embodiments.

FIG. 8 is a call flow diagram illustrating operations to support an immersive experience in a teleconference or telepresence session in accordance with various embodiments. With reference to FIGS. 1A-8, the operations between the call participants (e.g., call participant #1 and #2) and the call server may include in operation 1) the participants (e.g., call participant #1 and #2) use the provided link to a web page to join the WebRTC conference. In operation 2) the call server provides the participants (e.g., call participant #1 and #2) with the web page together with a scene graph file that sets up the initial/default arrangement in 3D space of the call participants (e.g., call participant #1 and #2) and material. For example, each participant will be assigned a visual node, an audio source node, and potentially also a node for graphics and other shared content. In operation 3), each participant (e.g., call participant #1 and #2) may add or modify the nodes that it owns in the scene graph. In operation 4), the media streams that provide the components for the nodes in the scene graph can be streamed using WebRTC. These streams can be exchanged directly or through a server, e.g. a media proxy server.

Figure 9:
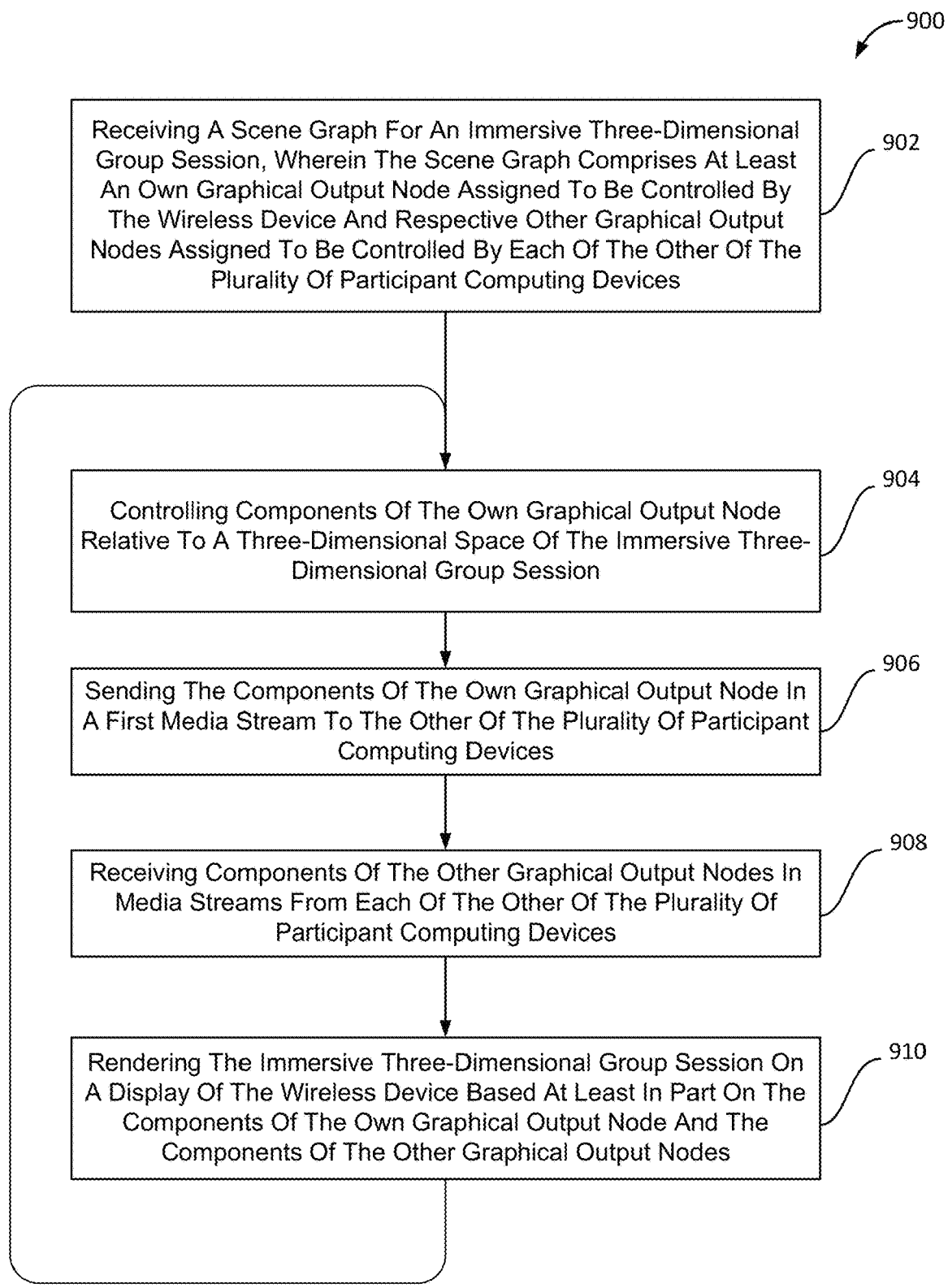
FIG. 9 is a process flow diagram illustrating a method for providing an immersive three-dimensional group session in accordance with various embodiments.

FIG. 9 is a process flow diagram illustrating a method 900 for providing an immersive three-dimensional group session in accordance with various embodiments. With reference to FIGS. 1A-9, the method 900 may be implemented by a processor (such as 156, 212, 216, 252 or 260) of a wireless device (such as the wireless device 120*a*-120*e*, 172, 200, 320). In various embodiments, the operations of the method 900 may be performed by a processor of a wireless device that is one of a plurality of participant computing devices in a teleconference or telepresence session, such as an immersive three-dimensional group session. In various embodiments, the operations of the method 900 may be performed in conjunction with any one or more of the operations of the methods 400 (FIG. 4) and/or 500 (FIG. 5).

In block 902, the processor may perform operations including receiving a scene graph for an immersive three-dimensional group session in which the scene graph comprises at least an own graphical output node assigned to be controlled by the wireless device and respective other graphical output nodes assigned to be controlled by each of the other of the plurality of participant computing devices. For example, the scene graph may be a scene graph as illustrated in FIG. 8.

Portions of the scene graph received in block 902 may be assigned to each participant computing device in the immersive three-dimensional group session, such as one or more nodes to each respective participant computing device. By parsing the scene graph, the processor of the wireless device may determine the nodes to be controlled by the wireless device. Assigning graphical output nodes on a per-participant computing device basis may enable each participant computing device to control at least one graphical output node. Graphical output nodes may include components defining three-dimensional objects to be output in the three-dimensional space defined by the scene graph. For example, the three-dimensional objects may include avatars, characters, or other representations and the components of the graphical output node may define how a three-dimensional object is to be rendered in the three-dimensional space of the immersive three-dimensional group session. In this manner, by controlling the components of its assigned respective graphical output node, the processor of the wireless device may control how other participant computing devices view the three-dimensional object or objects associated with the wireless device, such as the avatar, character, or other representation selected by a user of the wireless device in the immersive three-dimensional group session. Similarly, by controlling the components of their respective assigned graphical output nodes, the other participant computing devices may control how the user of the wireless devices views their respective associated three-dimensional object or objects, such as avatars, characters, or other representations in the immersive three-dimensional group session.

In block 904, the processor may perform operations including controlling components of the own graphical output node relative to a three-dimensional space of the immersive three-dimensional group session. In some embodiments, a user may adjust the own graphical node, such as moving the placement of the own graphical node in a scene independently of the position of the wireless device. For example, the user may select a position in the scene at which to display his or her three-dimensional object (e.g., avatar, character, etc.) in a scene. In some embodiments, controlling components of the own graphical output node may include controlling components of the own graphical output node based at least in part on a determined position of the wireless device relative to a three-dimensional space of the immersive three-dimensional group session. In some embodiments, a position of the wireless device may be determined in the three-dimensional space, such as a position relative to a central point, grid coordinate, or other reference for the three-dimensional space. As some immersive three-dimensional group sessions may support movement of the participants within the three-dimensional space for the immersive three-dimensional group session, determining the position of the wireless device may support rendering the objects for the graphical output node of the wireless device in a correct relative position. As a specific example, the lighting and/or camera components of the wireless device's assigned own graphical output node may be controlled to reflect the lighting and/or camera components of the current position of the wireless device in the three-dimensional space for the immersive three-dimensional group session.

In addition to controlling components of the own graphical output node based on position in block 904, the components of the own graphical output node may be controlled based on other metrics, such as an orientation of the wireless device. For example, movements of position and changes in orientation relative to a common reference point and common reference plane as indicated by accelerometers of the wireless device may be used to determine the position and orientation of the wireless device relative to the three-dimensional space of the immersive three-dimensional group session. As a specific example, the lighting and/or camera components of the wireless device's assigned own graphical output node may be controlled to reflect the lighting and/or camera components of the current position and current orientation of the wireless device in the three-dimensional space for the immersive three-dimensional group session. Controlling the components of the own graphical output node based on current position and/or current orientation may be usefully in implementations in which the wireless device is a head-mounted device to enable movement of the user of the head-mounted device to be visually imparted to other participants in the immersive three-dimensional group session.

In block 906, the processor may perform operations including sending the components of the own graphical output node in a first media stream to the other of the plurality of participant computing devices. The components may be sent in a media stream directly to other participant computing devices and/or via a call server (e.g., 150), such as a MRF, MCU, teleconferencing application server, etc. In this manner, the processor of the wireless device may provide the media stream for its own respective graphical output node to the other participant computing devices and thereby control how the other participant computing devices render that graphical output node.

In block 908, the processor may perform operations including receiving components of the other graphical output nodes in media streams from each of the other of the plurality of participant computing devices. The components may be received in media streams directly from each of the other participant computing devices and/or via a call server (e.g., 150), such as a MRF, MCU, teleconferencing application server, etc. In this manner, the processor of the wireless device may receive the media streams of the graphical output nodes assigned to the other participant computing devices.

In block 910, the processor may perform operations including rendering the immersive three-dimensional group session on a display of the wireless device based at least in part on the components of the own graphical output node and the components of the other graphical output nodes. For example, the components of the media stream of the wireless device and the components of the media streams of the other participant computing devices may be overlaid together with the components of other media streams to generate a displayed output of the three-dimensional space of the immersive three-dimensional group session.

The processor may perform the operations of blocks 904, 906, 908, and 910 continually during the immersive three-dimensional group session to render the immersive three-dimensional group session.

Figure 10:
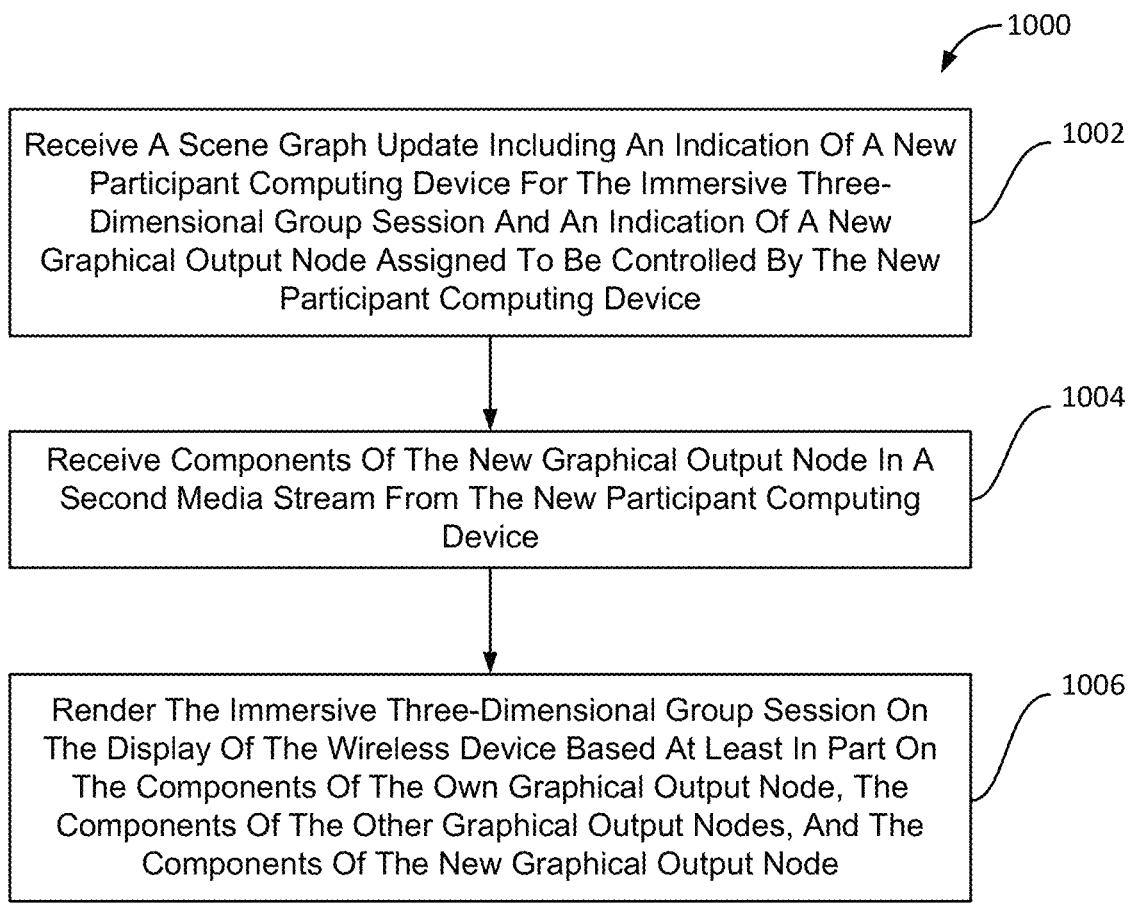
FIG. 10 is a process flow diagram illustrating a method for providing an immersive three-dimensional group session in accordance with various embodiments.

FIG. 10 is a process flow diagram illustrating a method 1000 for providing an immersive three-dimensional group session in accordance with various embodiments. With reference to FIGS. 1A-10, the method 1000 may be implemented by a processor (such as 156, 212, 216, 252 or 260) of a wireless device (such as the wireless device 120a-120e, 172, 200, 320). In various embodiments, the operations of the method 1000 may be performed by a processor of a wireless device that is one of a plurality of participant computing devices in a teleconference or telepresence session, such as an immersive three-dimensional group session. In various embodiments, the operations of the method 1000 may be performed in conjunction with any one or more of the operations of methods 400 (FIG. 4), 500 (FIG. 5), and/or 900 (FIG. 9). As a specific example, the operations of the method 1000 may be performed as part of the operations of block 910 of the method 900 to render the immersive three-dimensional group session.

In block 1002, the processor may perform operations including receiving a scene graph update including an indication of a new participant computing device for the immersive three-dimensional group session and an indication of a new graphical output node assigned to be controlled by the new participant computing device. The scene graph update may be sent by a host computing device in response to a new participant joining the immersive three-dimensional group session. In some embodiments, the scene graph update may be received directly from another participant computing device and/or via a call server (e.g., 150), such as an MRF, MCU, teleconferencing application server, etc.

In block 1004, the processor may perform operations including receiving components of the new graphical output node in a second media stream from the new participant computing device. The components may be received in a media stream directly from the new participant computing device and/or via a call server (e.g., 150), such as an MRF, MCU, teleconferencing application server, etc. In this manner, the processor of the wireless device may receive the media stream of the graphical output node assigned to the newly added participant computing device.

In block 1006, the processor may perform operations including rendering the immersive three-dimensional group session on the display of the wireless device based at least in part on the components of the own graphical output node, the components of the other graphical output nodes, and the components of the new graphical output node. For example, the components of the media stream of the wireless device and the components of the media streams of the other participant computing devices, including the second media stream of the newly added participant computing device, may be overlaid together with the components of other media streams to generate a displayed output of the three-dimensional space of the immersive three-dimensional group session.

Figure 11:
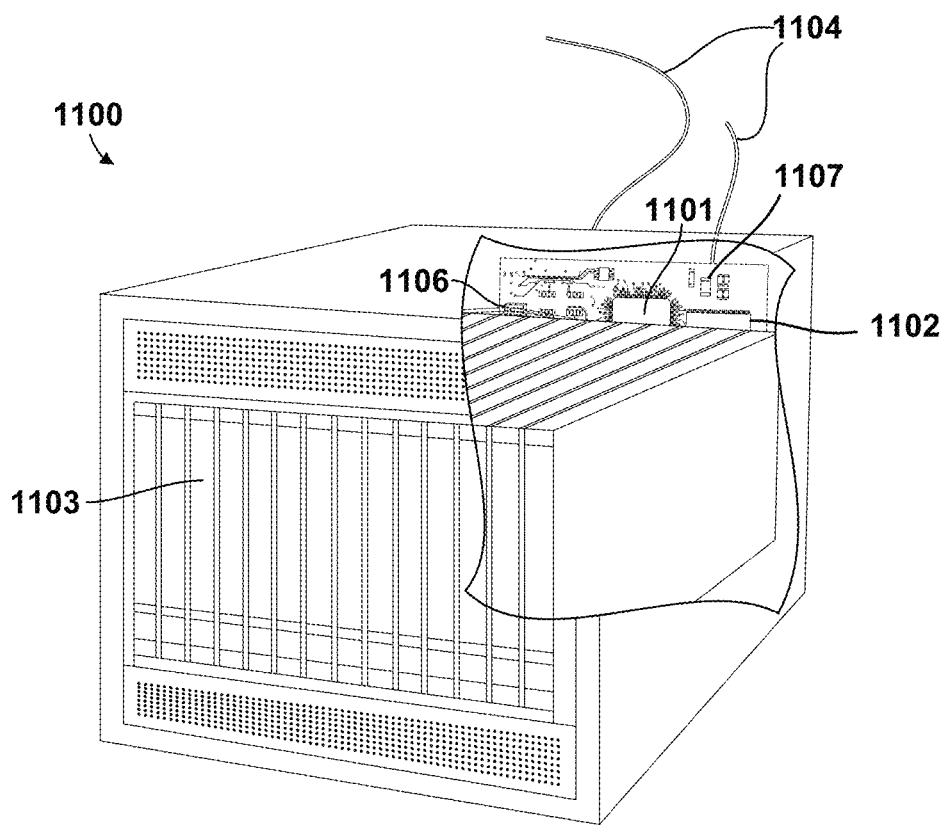
FIG. 11 is a component block diagram of an example server suitable for implementing various embodiments.

Various embodiments may be implemented on a variety of wireless network devices, an example of which is illustrated in FIG. 11 in the form of a wireless network computing device 1100 functioning as a network element of a communication network, such as call server (e.g., call server 150). Such network computing devices may include at least the components illustrated in FIG. 11. With reference to FIGS. 1A-11, the network computing device 1100 may typically include a processor 1101 coupled to volatile memory 1102 and a large capacity nonvolatile memory, such as a disk drive 1103. The network computing device 1100 may also include a peripheral memory access device such as a floppy disc drive, compact disc (CD) or digital video disc (DVD) drive 1106 coupled to the processor 1101. The network computing device 1100 may also include network access ports 1104 (or interfaces) coupled to the processor 1101 for establishing data connections with a network, such as the Internet and/or a local area network coupled to other system computers and servers. The network computing device 1100 may include one or more antennas 1107 for sending and receiving electromagnetic radiation that may be connected to a wireless communication link. The network computing device 1100 may include additional access ports, such as USB, Firewire, Thunderbolt, and the like for coupling to peripherals, external memory, or other devices.

Figure 12:
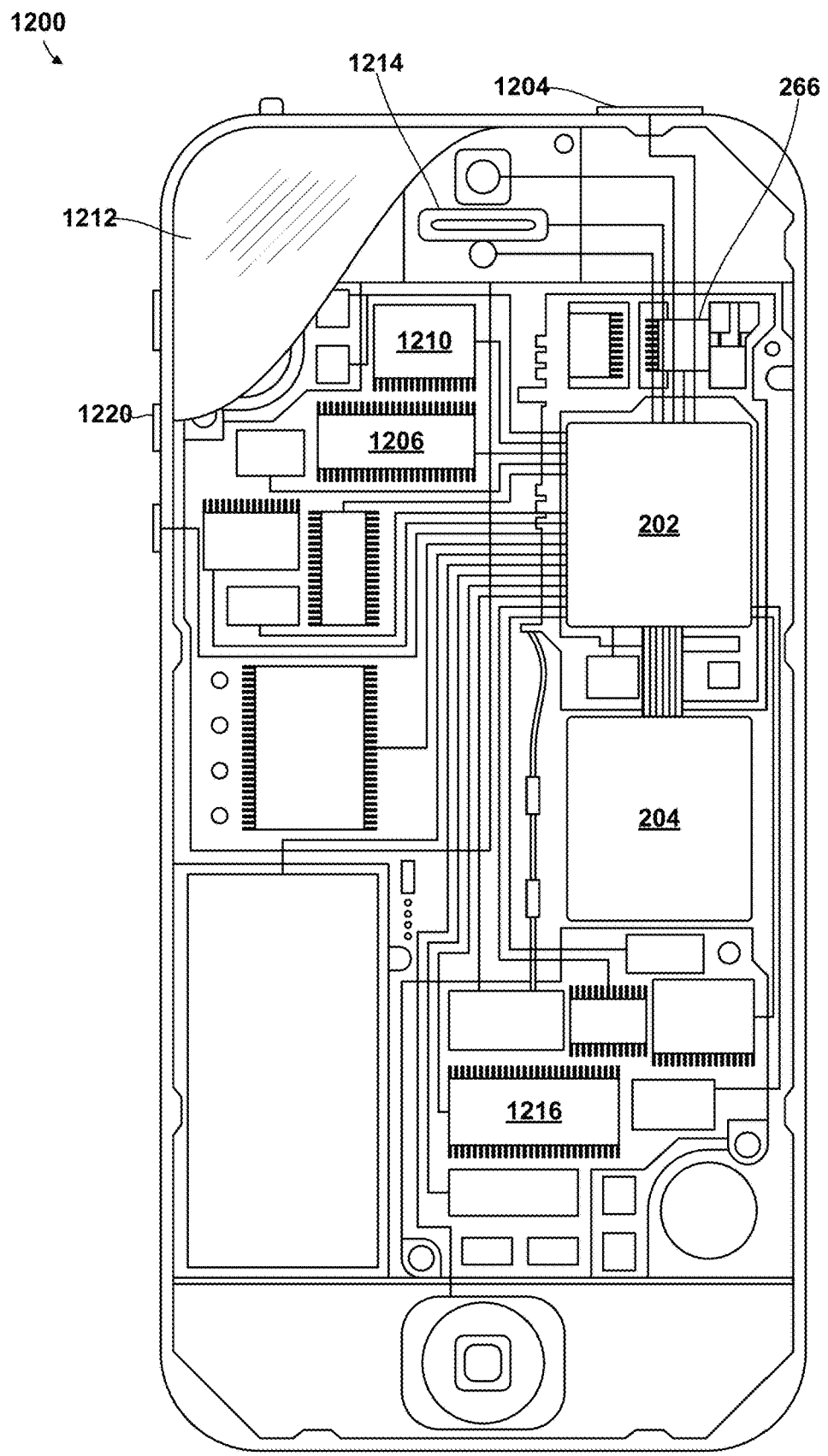
FIG. 12 is a component block diagram of a wireless device suitable for implementing various embodiments.

Various embodiments may be implemented on a variety of wireless devices (e.g., the wireless device 120a-120e, 172, 200, 320), an example of which is illustrated in FIG. 12 in the form of a smartphone 1200. With reference to FIGS. 1A-12, the smartphone 1200 may include a first SOC 202 (e.g., a SOC-CPU) coupled to a second SOC 204 (e.g., a 5G capable SOC). The first and second SOCs 202, 204 may be coupled to internal memory 1206, 1216, a display 1212, and to a speaker 1214. Additionally, the smartphone 1200 may include an antenna 1204 for sending and receiving electromagnetic radiation that may be connected to a wireless data link and/or cellular telephone transceiver 266 coupled to one or more processors in the first and/or second SOCs 202, 204. Smartphones 1200 typically also include menu selection buttons or rocker switches 1220 for receiving user inputs.

A typical smartphone 1200 also includes a sound encoding/decoding (CODEC) circuit 1210, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 1210 may include a digital signal processor (DSP) circuit (not shown separately).

The processors of the wireless network computing device 1100 and the smart phone 1200 may be any programmable microprocessor, microcomputer or multiple processor chip or chips that can be configured by software instructions (applications) to perform a variety of functions, including the functions of the various embodiments described below. In some wireless devices, multiple processors may be provided, such as one processor within an SOC 204 dedicated to wireless communication functions and one processor within an SOC 202 dedicated to running other applications. Typically, software applications may be stored in the memory 1206, 1216 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 400, 500, 900, and/or 1000 may be substituted for or combined with one or more operations of the methods 400, 500, 900, and/or 1000.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a wireless device that is one of a plurality of participant computing devices operating in an immersive three-dimensional group session, comprising:
   receiving a scene graph for an immersive three-dimensional group session, wherein the scene graph indicates that at least an own graphical output node is controlled by the wireless device and indicates that respective other graphical output nodes are controlled by each of the other of the plurality of participant computing devices;
   controlling components of the own graphical output node relative to a three-dimensional space of the immersive three-dimensional group session;
   sending the components of the own graphical output node in a first media stream to the other of the plurality of participant computing devices;
   receiving components of the other graphical output nodes in media streams from each of the other of the plurality of participant computing devices; and
   rendering the immersive three-dimensional group session on a display of the wireless device based at least in part on the components of the own graphical output node and the components of the other graphical output nodes.

2. The method of claim 1, further comprising:
   receiving a scene graph update including an indication of a new participant computing device for the immersive three-dimensional group session and an indication of a new graphical output node controlled by the new participant computing device;
   receiving components of the new graphical output node in a second media stream from the new participant computing device; and
   rendering the immersive three-dimensional group session on the display of the wireless device based at least in part on the components of the own graphical output node, the components of the other graphical output nodes, and the components of the new graphical output node.

3. The method of claim 1, further comprising:
   receiving a session description protocol (SDP) for the immersive three-dimensional group session indicating an address of a data channel over which the scene graph will be shared,
   wherein receiving the scene graph comprises downloading the scene graph via the data channel.

4. The method of claim 1, further comprising:
   sending an offer to send or to receive the scene graph to the other of the plurality of participant computing devices as part of session initiation protocol (SIP) setup for the immersive three-dimensional group session.

5. The method of claim 1, further comprising:
   sending an offer to send or to receive the scene graph to the other of the plurality of participant computing devices, wherein the offer indicates the own graphical output node.

6. The method of claim 1, wherein the immersive three-dimensional group session is a Web Real-Time Communications (WebRTC) session.

7. The method of claim 1, wherein controlling components of the own graphical output node relative to the three-dimensional space of the immersive three-dimensional group session comprises controlling components of the own graphical output node based at least in part on a determined position of the wireless device relative to the three-dimensional space of the immersive three-dimensional group session.

8. The method of claim 7, wherein controlling components of the own graphical output node based at least in part on the determined position of the wireless device relative to the three-dimensional space of the immersive three-dimensional group session comprises controlling components of the own graphical output node based at least in part on the determined position of the wireless device relative to the three-dimensional space of the immersive three-dimensional group session and a determined orientation of the wireless device relative to the three-dimensional space of the immersive three-dimensional group session.

9. A wireless device, comprising:
a display; and
a processor coupled to the display, the processor configured with processor-executable instructions to:
receive a scene graph for an immersive three-dimensional group session, wherein the scene graph indicates that at least an own graphical output node is controlled by the wireless device and indicates that respective other graphical output nodes are controlled by each of a plurality of participant computing devices;
control components of the own graphical output node relative to a three-dimensional space of the immersive three-dimensional group session;
send the components of the own graphical output node in a first media stream to the other of the plurality of participant computing devices;
receive components of the other graphical output nodes in media streams from each of the other of the plurality of participant computing devices; and
render the immersive three-dimensional group session on the display of the wireless device based at least in part on the components of the own graphical output node and the components of the other graphical output nodes.

10. The wireless device of claim 9, wherein the processor is further configured with processor-executable instructions to:
receive a scene graph update including an indication of a new participant computing device for the immersive three-dimensional group session and an indication of a new graphical output node controlled by the new participant computing device;
receive components of the new graphical output node in a second media stream from the new participant computing device; and
render the immersive three-dimensional group session on the display of the wireless device based at least in part on the components of the own graphical output node, the components of the other graphical output nodes, and the components of the new graphical output node.

11. The wireless device of claim 9, wherein the processor is further configured with processor-executable instructions to:
receive a session description protocol (SDP) for the immersive three-dimensional group session indicating an address of a data channel over which the scene graph will be shared, and
wherein the processor is further configured with processor-executable instructions to receive the scene graph by downloading the scene graph via the data channel.

12. The wireless device of claim 9, wherein the processor is further configured with processor-executable instructions to:
send an offer to send or to receive the scene graph to the other of the plurality of participant computing devices as part of session initiation protocol (SIP) setup for the immersive three-dimensional group session.

13. The wireless device of claim 9, wherein the processor is further configured with processor-executable instructions to:
send an offer to send or to receive the scene graph to the other of the plurality of participant computing devices, wherein the offer indicates the own graphical output node.

14. The wireless device of claim 9, wherein the immersive three-dimensional group session is a Web Real-Time Communications (WebRTC) session.

15. The wireless device of claim 9, wherein the processor is further configured with processor-executable instructions to control components of the own graphical output node relative to the three-dimensional space of the immersive three-dimensional group session by controlling components of the own graphical output node based at least in part on a determined position of the wireless device relative to the three-dimensional space of the immersive three-dimensional group session.

16. The wireless device of claim 15, wherein the processor is further configured with processor-executable instructions to control components of the own graphical output node based at least in part on the determined position of the wireless device relative to the three-dimensional space of the immersive three-dimensional group session by controlling components of the own graphical output node based at least in part on the determined position of the wireless device relative to the three-dimensional space of the immersive three-dimensional group session and a determined orientation of the wireless device relative to the three-dimensional space of the immersive three-dimensional group session.

17. A non-transitory processor readable medium having stored thereon processor-executable instructions configured to cause a processor of a wireless device to perform operations comprising:
receiving a scene graph for an immersive three-dimensional group session, wherein the scene graph indicates that at least an own graphical output node is controlled by the wireless device and indicates that respective other graphical output nodes are controlled by each of a plurality of participant computing devices;
controlling components of the own graphical output node relative to a three-dimensional space of the immersive three-dimensional group session;
sending the components of the own graphical output node in a first media stream to the other of the plurality of participant computing devices;
receiving components of the other graphical output nodes in media streams from each of the other of the plurality of participant computing devices; and
rendering the immersive three-dimensional group session on a display of the wireless device based at least in part on the components of the own graphical output node and the components of the other graphical output nodes.

18. The non-transitory processor readable medium of claim 17, wherein the stored processor-executable instructions are configured to cause a processor of a wireless device to perform operations further comprising:

receiving a scene graph update including an indication of a new participant computing device for the immersive three-dimensional group session and an indication of a new graphical output node controlled by the new participant computing device;

receiving components of the new graphical output node in a second media stream from the new participant computing device; and rendering the immersive three-dimensional group session on the display of the wireless device based at least in part on the components of the own graphical output node, the components of the other graphical output nodes, and the components of the new graphical output node.

19. The non-transitory processor readable medium of claim 17, wherein the stored processor-executable instructions are configured to cause a processor of a wireless device to perform operations further comprising:

receiving a session description protocol (SDP) for the immersive three-dimensional group session indicating an address of a data channel over which the scene graph will be shared, and wherein the processor-executable instructions are configured to cause a processor of a wireless device to perform operations such that receiving the scene graph comprises downloading the scene graph via the data channel.

20. The non-transitory processor readable medium of claim 17, wherein the stored processor-executable instructions are configured to cause a processor of a wireless device to perform operations further comprising:

sending an offer to send or to receive the scene graph to the other of the plurality of participant computing devices as part of session initiation protocol (SIP) setup for the immersive three-dimensional group session.

21. The non-transitory processor readable medium of claim 17, wherein the stored processor-executable instructions are configured to cause a processor of a wireless device to perform operations further comprising:

sending an offer to send or to receive the scene graph to the other of the plurality of participant computing devices, wherein the offer indicates the own graphical output node.

22. The non-transitory processor readable medium of claim 17, wherein the immersive three-dimensional group session is a Web Real-Time Communications (WebRTC) session.

23. The non-transitory processor readable medium of claim 17, wherein the stored processor-executable instructions are configured to cause a processor of a wireless device to perform operations such that controlling components of the own graphical output node relative to the three-dimensional space of the immersive three-dimensional group session comprises controlling components of the own graphical output node based at least in part on a determined position of the wireless device relative to the three-dimensional space of the immersive three-dimensional group session.

24. The non-transitory processor readable medium of claim 17, wherein the stored processor-executable instructions are configured to cause a processor of a wireless device to perform operations such that controlling components of the own graphical output node based at least in part on the determined position of the wireless device relative to the three-dimensional space of the immersive three-dimensional group session comprises controlling components of the own graphical output node based at least in part on the determined position of the wireless device relative to the three-dimensional space of the immersive three-dimensional group session and a determined orientation of the wireless device relative to the three-dimensional space of the immersive three-dimensional group session.

25. A wireless device, comprising:

means for receiving a scene graph for an immersive three-dimensional group session, wherein the scene graph indicates that at least an own graphical output node is controlled by the wireless device and indicates that respective other graphical output nodes are controlled by each of a plurality of participant computing devices;

means for controlling components of the own graphical output node relative to a three-dimensional space of the immersive three-dimensional group session;

means for sending the components of the own graphical output node in a first media stream to the other of the plurality of participant computing devices;

means for receiving components of the other graphical output nodes in media streams from each of the other of the plurality of participant computing devices; and means for rendering the immersive three-dimensional group session on a display of the wireless device based at least in part on the components of the own graphical output node and the components of the other graphical output nodes.

26. The wireless device of claim 25, further comprising:

means for receiving a scene graph update including an indication of a new participant computing device for the immersive three-dimensional group session and an indication of a new graphical output node controlled by the new participant computing device;

means for receiving components of the new graphical output node in a second media stream from the new participant computing device; and means for rendering the immersive three-dimensional group session on the display of the wireless device based at least in part on the components of the own graphical output node, the components of the other graphical output nodes, and the components of the new graphical output node.

27. The wireless device of claim 25, further comprising:

means for receiving a session description protocol (SDP) for the immersive three-dimensional group session indicating an address of a data channel over which the scene graph will be shared, wherein means for receiving the scene graph comprises means for downloading the scene graph via the data channel.

28. The wireless device of claim 25, further comprising:

means for sending an offer to send or to receive the scene graph to the other of the plurality of participant computing devices as part of session initiation protocol (SIP) setup for the immersive three-dimensional group session.

29. The wireless device of claim 25, further comprising:

means for sending an offer to send or to receive the scene graph to the other of the plurality of participant computing devices, wherein the offer indicates the own graphical output node.

30. The wireless device of claim 25, wherein the immersive three-dimensional group session is a Web Real-Time Communications (WebRTC) session.

* * * * *